United States Patent Office 3,305,515
Patented Feb. 21, 1967

3,305,515
SOLVENT FOR POLYBUTADIENE RUBBER
Arthur M. Thomas, Jr., Rahway, N.J., assignor to Esso Research and Engineering Company, a corporation of Delaware
No Drawing. Filed May 6, 1964, Ser. No. 365,499
5 Claims. (Cl. 260—33.6)

This invention relates to hydrocarbon solvents and more particularly relates to mixtures of specific hexanes which are especially suitable as solvents for stereo-polybutadienes having a substantial cis-1,4 structure.

The production of stereo-polybutadiene having a high cis-1,4 structure is well known to the art. These processes use Ziegler-Natta catalysts consisting of alkyl metal alone, alkyl metal mixed with alkyl chloride and/or metal halide. Polymers having lower cis-1,4 structure may also be prepared from alkali metals or their organic compounds. Polymerization takes place when catalyst system and reactive monomer are brought together in a non-reactive hydrocarbon solvent. The polybutadienes prepared by these methods contain from 20 to 99 wt. percent cis-1,4 structural units. Typical of the commercial products are Diene 55 made by Firestone Tire and Rubber Co., Budene made by Goodyear Tire and Rubber Co., Philprene CIS-4 made by Phillips Chemical Co., and Ameripol CB-220 made by Goodrich Gulf Chemicals Co.

As the polymerization reaction proceeds, the polybutadiene is formed in solution in a hydrocarbon solvent. As the molecular weight of the polymer increases, the viscosity of the solution increases. Under these conditions, in addition to serving as a medium to bring the reactants together the solvent also serves to keep the polymer in a fluid solution to allow proper mixing and pumping. It is desirable to control the amount of solvent present during reaction, so that when reaction is complete only the minimum quantity of solvent will have to be removed from the finished polymer. At the conclusion of reaction the polymer content of the solution may be from 10 to 20 wt. percent. Commercial solvent hexane (mixture of isomers) is a widely used hydrocarbon solvent at the present time.

It is highly desirable that the viscosity of the stereopolymer in a given solvent be maintained as low as possible to afford better mixing, easier pumping and better heat transfer during preparation of these polymers.

In many instances in the manufacture of rubber goods from polybutadiene polymers, it may be necessary to redissolve the polymer in a volatile solvent such as hexane to facilitate spraying, dipping or other coating or compounding procedures. Again minimum viscosity solutions at maximum concentrations of polymer are desired.

Each of the polymers present different solubility characteristics for the common hydrocarbon solvents, some of the polymers being soluble in one set of hydrocarbons and others being soluble in a different set. For example, it has been found that some of the stereo-polybutadienes are insoluble in certain of the hexane isomers. There are only five isomeric hexanes, namely: n-hexane; 2-methyl pentane; 3-methyl pentane; 2,2-dimethyl pentane; and 2,3-dimethylbutane. Of these Budene is insoluble in all but n-hexane; Philprene CIS-4 and Ameripol CB-220 are not soluble in 2-methyl pentane and 2,2-dimethylbutane, while Diene-55 is soluble in all of the isomeric hexanes.

Accordingly, it is eminently desirable to find the solvent or solvents which will dissolve all of these stereo-polymers and which solvent at the same time gives a minimum viscosity for the same concentration of polymer.

In accordance with this invention it has now been surprisingly discovered that all of these stereo-polybutadienes are soluble and form minimum viscosity solutions in mixtures of the isomeric hexanes containing either 2-methyl pentane or 2,2-dimethylbutane. Thus, these polybutadienes are soluble in 2-methyl pentane mixed with n-hexane, 3-methyl pentane, or 2,3-dimethylbutane, or their mixtures or in 2,2-dimethylbutane with n-hexane, 3-methylpentane, or 2,3-dimethylbutane, or their mixtures or in any mixture of these two sets of solvents. Minimum viscosity solutions are obtained in solvents which have the lowest solvency for the polymer so long as they are still solvents for the polymer. Thus, minimum viscosity is achieved in solvents whose compositions are such that the polymer is close to the point of precipitation. For the solvent mixtures given above, the lowest viscosity is obtained with 30 wt. percent 2,2-dimethylbutane and 70 wt. percent of any other isomeric hexane except 2-methyl pentane or mixtures thereof or with 40 wt. percent 2-methyl pentane and 60 wt. percent of any other isomeric hexane except 2,2-dimethylbutane or mixtures thereof.

In contrast to the above much higher viscosity solutions are obtained by dissolving the polybutadiene in aromatic and naphthene hydrocarbons.

Since, for practical purposes, a margin is desirable, this invention is directed therefore to the following new compositions of matter consisting essentially of:

(1) A mixture of 35 to 40 wt. percent of 2-methyl pentane and 65 to 60 wt. percent of a hexane chosen from the group consisting of n-hexane; 3-methyl pentane; 2,3-dimethylbutane and mixtures thereof.

(2) A mixture of 25 to 30 wt. percent of 2,2-dimethylbutane and 75 to 70 wt. percent of a hexane chosen from the group consisting of n-hexane; 3-methyl pentane; 2,3-dimethylbutane and mixtures thereof.

(3) Any mixture of 1 and 2.

(4) A stereo-polybutadiene rubber having cis-1,4 content of 20 to 99 wt. percent dissolved in one of the above mixtures.

In practicing this invention stereo-polybutadienes are those prepared by the use of catalysts designed to give a specific stereo structure. Polybutadienes having from 89 to 98% cis-1,4 structure are prepared by solution polymerization of butadiene using compounds of the transition elements of Groups IV to VIII of the periodic system alone or with compounds of the metals of groups I to III, e.g. a mixture of titanium tetrahalide with aluminum trialkyl. Thus, in accordance with Belgian patent, No. 575,671, granted February 28, 1959, to Goodrich Gulf Chemicals, a cis-1,4 polybutadiene having 98 wt. percent cis-1,4 structure is prepared by polymerizing butadiene in solution in an inert hydrocarbon solvent with a catalyst consisting of the reaction product of a di- or tri-valent cobalt salt with an organometallic compound such as an aluminum alkyl halide.

A polymer having 95 wt. percent cis-1,4 structure can be prepared by polymerizing butadiene at 10–50° C. in a hydrocarbon solvent in the presence of aluminum triethyl or tri-isobutyl and titanium tetraiodide according to Indian Patent No. 58,709, accepted April 23, 1958, and issued to Phillips Petroleum Co.

Other catalyst systems which give stereo-polybutadienes having high cis-1,4 structures are a mixture of metal-organo compounds of Groups II and III of the periodic system and a xanthogenate, diethiocarbamate, acetyl acetonate or naphthenate of cobalt of nickel with or without a complexing agent such as phosphine, arsine, stibine or an alkyl phosphate or phosphite (Austral. appln. 45,671/59—open to public inspection Aug. 16, 1958).

An aluminum alkyl halide and a beta-diketo derivative of a metal of Group VIII of the periodic system present in the molar ratio of at least 30:1, e.g. a nickel or cobalt acetylacetonate, benzylacetonate or benzylacetophenonate polymerizes butadiene to polybutadiene containing 93 wt. percent cis-1,4 structure (Austral. appln. 50,066/59, open to public inspection December 24, 1959 to Montecatini). The disclosures of all of the above patents are incorporated herein by reference.

Polybutadienes having about 20 to 40% cis-1,4 structure are prepared by solution polymerization using alkali metals or organic compounds thereof as catalysts. For example, in British Patent No. 817,693, to Firestone Tire and Rubber Co., butadiene alone or mixed with styrene is polymerized in the presence of a lithium-dependent catalyst and in the absence of oxygen or oxygen containing compounds to give a product containing at least 23% cis-1,4 structure. A survey of the various methods of preparing polybutadiene and their structure can be found in an article by H. Blumel in Kautschuk and Gummi-Kunstoffe, volume 16, No. 10, pages 571–582 (1963) and is incorporated herein by reference.

The solvents if this invention are designed to be used as solvents in any of the above polymerizations and in the solution storage of the products to give minimum viscosity solutions. They may also be used in manufacturing of finished rubber goods from raw polymers where this is done in solution.

The advantages of the invention will be better understood from a consideration of the following experimental data which are given for sake of illustration, but without intention of limiting the invention thereto.

*Example 1*

Solutions of various stereo-polybutadienes, namely Philprene CIS-4, Ameripol CB, Diene 55, and Budene having the following characteristics

|  | Diene 55 | Budene | Philprene CIS-4 | Ameripol CB-220 |
|---|---|---|---|---|
| Percent Cis-1,4, wt. percent | 35 | 92 | 95 | 98 |
| Mooney, Vis | 50–60 | 45–55 | 40–50 | 35–48 |
| Sp. Gr. | .9 | .89 | .89 | .89 | were prepared by mixing elastomer and solvent in the desired concentration in a sealed paint can on a paint shaker. Mixing time depended upon the ease of solution of the polymer and ranged from one to three hours. This technique results in no loss of solvent by evaporation during the mixing procedure. The viscosity of the solutions were measured using an extrusion viscometer of the type described in ASTM D–1092 or with a Severs Extrusion Rheometer, both of which give the same results. The apparatus described in ASTM D–1092 uses hydraulic pressure to force the solution, at constant flow rate, through a series of different capillary tubes. Tube size is proportional to shear rate. The Severs Extrusion Rheometer employs nitrogen at fixed pressure to force the solution through a single capillary tube. Under these conditions the shear rate is proportional to solution flow rate. The results are shown in the following tables.

TABLE I.—VISCOSITY OF SOLUTIONS OF PHILPRENE CIS-4

| Solvent | Solids Wt. Percent | Solids Lbs./Gal. | Shear Rate (Sec. $^{-1}$) | Viscosity (Poise) |
|---|---|---|---|---|
| n-Hexane | 20 | 1.1 | 150 / 570 / 3,450 | 79.1 / 42.2 / 13.9 |
| 2-methylpentane | 20 | 1.1 | No Solution | |
| 3-methylpentane | 20 | 1.1 | 150 / 570 / 3,390 | 79.1 / 42.2 / 14.2 |
| 2,2-dimethylbutane | 20 | 1.1 | No Solution | |
| 2,3-dimethylbutane | 20 | 1.1 | 150 / 650 / 4,500 | 79.1 / 37.2 / 10.7 |

TABLE II.—VISCOSITY OF SOLUTIONS OF AMERIPOL CB

| Solvent | Solids Wt. Percent | Solids Lbs./Gal. | Shear Rate (Sec. $^{-1}$) | Viscosity (Poise) |
|---|---|---|---|---|
| n-Hexane | 15 | 0.8 | 1,140 / 2,900 / 9,150 / 23,600 | 5.3 / 4.2 / 2.6 / 2.0 |
|  | 20 | 1.1 | 320 / 1,050 / 4,230 | 37.2 / 23.0 / 12.1 |
| 2-methylpentane | 15 | 0.8 | No Solution | |
| 3-methylpentane | 15 | 0.8 | 1,030 / 2,520 / 8,050 / 27,400 | 5.9 / 4.8 / 3.0 / 1.8 |
| 2,2-dimethylbutane | 15 | 0.8 | No Solution | |
| 2,3-dimethylbutane | 20 | 1.1 | 320 / 1,050 / 4,390 | 37.2 / 23.0 / 15.0 |

TABLE III.—VISCOSITY OF SOLUTIONS OF DIENE-55

| Solvent | Solids Wt. Percent | Solids Lbs./Gal. | Shear Rate (Sec. $^{-1}$) | Viscosity (Poise) |
|---|---|---|---|---|
| n-Hexane | 20 | 1.1 | 75 / 230 / 890 | 158 / 105 / 53.8 |
| 2-methylpentane | 20 | 1.1 | 80 / 210 / 900 | 160 / 100 / 55.1 |
| 3-methylpentane | 20 | 1.1 | 70 / 230 / 900 | 155 / 107 / 54.8 |
| 2,2-dimethylbutane | 20 | 1.1 | 65 / 250 / 900 | 157 / 109 / 53.1 |
| 2,3-dimethylbutane | 20 | 1.1 | 75 / 250 / 890 | 163 / 101 / 50.8 |

TABLE IV.—VISCOSITY OF SOLUTIONS OF BUDENE

| Solvent | Solids Wt. Percent | Solids Lbs./Gal. | Shear Rate (Sec. $^{-1}$) | Viscosity (Poise) |
|---|---|---|---|---|
| n-Hexane | 9.5 | 0.5 | 7,060 / 28,500 / 102,000 | 0.9 / 0.6 / 0.4 |
| 2-methylpentane | 9.5 | 0.5 | No Solution | |
| 3-methylpentane | 9.5 | 0.5 | No Solution | |
| 2,2-dimethylbutane | 9.5 | 0.5 | No Solution | |
| 2,3-dimethylbutane | 9.5 | 0.5 | No Solution | |

The above data show that there is no difference in the viscosities of polybutadiene solutions prepared in n-hexane or the isomers in which it is soluble.

Example 2

Solutions of each of the polymers of Example 1 were prepared in binary mixtures of n-hexane and 2,2-dimethylbutane and of n-hexane and 2-methylpentane, (Philprene CIS-4, Ameripol CB and Budene being insoluble in these two isomers) to determine the limits of solubility of each of these polybutadiene polymers in these mixtures. Viscosities were determined for Budene and Ameripol CB. The results are shown in Tables V and VI.

Table V shows that the mixtures of 30% dimethylbutane and 70% n-hexane are the solvent mixtures which have the lowest solvency for the polymer. When these data are compared with the data in Table I, it follows that the n-hexane can be substituted for any of the other isomeric hexanes in which the polymer is soluble.

Table VI shows that the isomeric mixtures give lowest viscosity solutions for Budene and Ameripol CB. This is true because the lowest viscosity polybutadiene solutions are obtained in solutions which have the lowest solvency for the polymer as long as they are still solvents for the polymer. This follows from the solubility parameters of the various hexanes and polybutadiene as described in an article by Beerbower et al. in ASLE Transactions, vol. 6: 80–88 (1963) and summarized in Table VII. From this table it is clear that the greater the difference between the parameter for the solvent and that for the polymer the lower the solubility of the polymer in the solvent. The study by Beerbower et al. also shows that when rubber and solvent solubility parameter are farthest apart, the lowest viscosity solution results. When these two conclusions are equated lowest viscosity solutions are obviously those in which the rubber is barely soluble.

From the above it is apparent that this invention covers the surprising discovery that certain mixtures of hexanes provide solvent mixtures which are uniquely solvents for all stereo-polybutadienes and which simultaneously give minimum viscosity solutions. These solutions are:

(1) A mixture of 35 to 40 wt. percent of 2-methylpentane and 65 to 60 wt. percent of a hexane chosen from the group consisting of n-hexane; 3-methylpentane; 2,3-dimethylbutane and mixtures thereof.

(2) A mixture of 25 to 30 wt. percent of 2,2-dimethylbutane and 75 to 70 wt. percent of a hexane chosen from the group consisting of n-hexane; 3-methylpentane; 2,3-dimethylbutane and mixtures thereof.

(3) Any mixtures of 1 and 2.

TABLE V.—LIMITS OF SOLUBILITY OF POLYBUTADIENE

| Solvent | Rubber Polymer | | | | | |
|---|---|---|---|---|---|---|
| | Composition | Solids (Wt. Percent) | Philprene CIS-4 | Budene | Ameripol CB | Diene 55 |
| 1 | 30% 2,2-dimethylbutane, 70% n-hexane. | 20 | S | S | S | S. |
| 2 | 35% 2,2-dimethylbutane, 65% n-hexane. | 20 | I | I | S | S. |
| 3 | 40% 2,2-dimethylbutane, 60% n-hexane. | 20 | I | I | S | S. |
| 4 | 45% 2,2-dimethylbutane, 55% n-hexane. | 20 | I | I | I | S. |
| 5 | 40% 2-methylpentane, 60% n-hexane. | 20 | S | S | S | S. |
| 6 | 45% 2-methylpentane, 55% n-hexane. | 20 | S | S | I | S. |
| 7 | 50% 2-methylpentane, 50% n-hexane. | 20 | S | S | I | S. |
| 8 | 55% 2-methylpentane, 45% n-hexane. | 20 | I | I | I | S. |

S = Soluble.  I = Insoluble.

TABLE VI.—VISCOSITY OF SOLUTIONS OF POLYBUTADIENE RUBBER

BUDENE

| Solvent | Solids | | Shear Rate (Sec. ⁻¹) | Viscosity (Poise) |
|---|---|---|---|---|
| | Wt. Percent | Lbs./Gal. | | |
| n-Hexane | 20 | 1.1 | 43 | 30,500 |
| | | | 115 | 17,500 |
| | | | 438 | 9,180 |
| | | | 2,850 | 2,810 |
| 30/70—2,2-dimethyl-butane/n-hexane. | 20 | 1.1 | 100 | 12,900 |
| | | | 285 | 7,000 |
| | | | 1,280 | 3,150 |
| | | | 6,930 | 1,160 |
| 50/50—2-methylpentane/n-hexane. | 20 | 1.1 | 62 | 19,100 |
| | | | 181 | 11,100 |
| | | | 666 | 6,030 |
| | | | 3,310 | 2,260 |

AMERIPOL CB

| Solvent | Solids | | Shear Rate (Sec. ⁻¹) | Viscosity (Poise) |
|---|---|---|---|---|
| | Wt. Percent | Lbs./Gal. | | |
| n-Hexane | 20 | 1.1 | 119 | 12,000 |
| | | | 324 | 7,180 |
| | | | 1,050 | 3,820 |
| | | | 4,040 | 1,980 |
| 40/60—2-methylpentane/n-hexane. | 20 | 1.1 | 119 | 10,000 |
| | | | 334 | 6,000 |
| | | | 1,260 | 3,180 |
| | | | 5,650 | 1,420 |

TABLE VII

COMPARISON OF SOLVENT AND POLYMER SOLUBILITY PARAMETERS

| POLYMER | SOLUBILITY PARAMETER | SOLVENT |
|---|---|---|
| | 7.0 | $C_5$, $C_6$, $C_7$ — ACYCLIC PARAFFINS |
| | 7.5 | |
| BUTYL | | $C_7$ — CYCLIC PARAFFINS |
| ETHYLENE/PROPYLENE → | 8.0 | $C_6$ |
| POLYISOBUTYLENE → | | |
| NATURAL-POLYISOPRENE → | | |
| POLYBUTADIENE → | 8.5 | |
| | | TOLUENE — AROMATIC |
| | 9.0 | BENZENE |

The advantages of the present invention having thus been fully set forth and specific examples of the same given, what is claimed as new and useful and desired to be secured by Letters Patent is:

1. A composition of matter consisting essentially of a mixture of 35 to 40 wt. percent of 2-methylpentane and 65 to 60 wt. percent of a hexane chosen from the group consisting of n-hexane; 3-methylpentane; 2,3-dimethylbutane and mixtures thereof.

2. A composition of matter consisting essentially of a stereo-polybutadiene rubber having cis-1,4 content greater than 35 wt. percent and dissolved in the mixture of claim 1.

3. A composition of matter consisting essentially of a mixture of 25 to 30 wt. percent of 2,2-dimethylbutane and 75 to 70 wt. percent of a hexane chosen from the group consisting of n-hexane; 3-methylpentane; 2,3-dimethylbutane and mixtures thereof.

4. A composition of matter consisting essentially of a mixture of a first component chosen from the group consisting of 35 to 40% of 2-methylpentane and 25 to 30 wt. percent of 2,2-dimethylbutane and mixtures thereof and enough of a second component to make 100 wt. percent chosen from the group consisting of n-hexane; 3-methylpentane; 2,3-dimethylpentane and mixtures thereof.

5. A composition of matter consisting essentially of a stereo-polybutadiene rubber having cis-1,4 content of 20 to 99 wt. percent and dissolved in the mixture of claim 4.

No references cited.

MORRIS LIEBMAN, *Primary Examiner.*

J. S. WALDRON, *Assistant Examiner.*